US011692493B1

(12) United States Patent
Hanrahan et al.

(10) Patent No.: US 11,692,493 B1
(45) Date of Patent: Jul. 4, 2023

(54) FLUIDIC VALVE CONFIGURATION FOR BOOST SPOOL ENGINE

(71) Applicant: Raytheon Technologies Corporation, Farmington, CT (US)

(72) Inventors: Paul R. Hanrahan, Sedona, AZ (US); Stephen K. Kramer, Cromwell, CT (US); Daniel B. Kupratis, Wallingford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/662,199

(22) Filed: May 5, 2022

(51) Int. Cl.
| | |
|---|---|
| *F02C 7/36* | (2006.01) |
| *F02C 9/18* | (2006.01) |
| *F02K 3/06* | (2006.01) |
| *F02C 7/18* | (2006.01) |
| *F02C 3/04* | (2006.01) |

(52) U.S. Cl.
CPC ............... *F02C 7/36* (2013.01); *F02C 9/18* (2013.01); *F02C 3/04* (2013.01); *F02C 7/18* (2013.01); *F02K 3/06* (2013.01); *F05D 2240/35* (2013.01)

(58) Field of Classification Search
CPC ............... F02C 9/18; F02C 6/02; F02K 3/12
See application file for complete search history.

(56) References Cited

U.S. PATENT DOCUMENTS

| | | | |
|---|---|---|---|
| 3,677,012 A * | 7/1972 | Batscha | F02K 3/11 60/262 |
| 4,147,024 A | 4/1979 | Moellmann | |
| 5,694,765 A | 12/1997 | Hield et al. | |
| 8,424,280 B2 | 4/2013 | Moore et al. | |
| 10,669,940 B2 | 6/2020 | Snape | |
| 10,914,234 B1 | 2/2021 | O'Flarity et al. | |
| 10,995,673 B2 | 5/2021 | Suciu et al. | |
| 11,143,142 B2 | 10/2021 | Hanrahan et al. | |
| 11,193,425 B2 | 12/2021 | Hanrahan et al. | |
| 11,560,233 B2 | 1/2023 | Dubreuil et al. | |
| 2012/0119020 A1 | 5/2012 | Burns et al. | |
| 2012/0119021 A1* | 5/2012 | Burns | B64D 27/16 244/58 |
| 2012/0216549 A1 | 8/2012 | Burns | |
| 2014/0260295 A1 | 9/2014 | Ullyott et al. | |
| 2016/0053721 A1 | 2/2016 | Fletcher et al. | |
| 2016/0186600 A1 | 6/2016 | Surace | |
| 2017/0113808 A1 | 4/2017 | Bond | |
| 2017/0241336 A1 | 8/2017 | Jones et al. | |
| 2017/0248081 A1 | 8/2017 | Roach et al. | |
| 2017/0298826 A1 | 10/2017 | Ryznic et al. | |
| 2018/0010476 A1 | 1/2018 | Brostmeyer et al. | |
| 2018/0156121 A1 | 6/2018 | Snape et al. | |

(Continued)

*Primary Examiner* — Scott J Walthour
*Assistant Examiner* — David P. Olynick
(74) *Attorney, Agent, or Firm* — Kinney & Lange, P. A.

(57) ABSTRACT

A gas turbine engine includes a first spool associated with a diffuser and a primary combustor and a second spool associated with a secondary combustor. The first spool includes a first compressor and a first turbine mounted to a first shaft, and the second spool includes a second compressor and a second turbine mounted to a second shaft. An inlet duct fluidly connects the diffuser to the second compressor. An outlet duct assembly fluidly connects the second turbine to the diffuser and the primary combustor.

15 Claims, 5 Drawing Sheets

(56) References Cited

U.S. PATENT DOCUMENTS

2019/0063331 A1 2/2019 Beauchesne-Martel et al.
2019/0368417 A1 12/2019 Terwilliger et al.
2020/0032702 A1 1/2020 Kupratis et al.
2020/0040848 A1 2/2020 Hanrahan et al.
2020/0386188 A1 12/2020 Kupratis et al.
2020/0400078 A1 12/2020 Hanrahan et al.

* cited by examiner

FLUIDIC VALVE CONFIGURATION FOR BOOST SPOOL ENGINE

BACKGROUND

The present disclosure relates generally to gas turbine engines and, more particularly, to gas turbine engines capable of operating in a high overall pressure ratio (OPR) mode and in a low OPR mode to adapt to the ambient conditions and to provide more efficient operation without exceeding thermal limits of the gas turbine engine.

The overall pressure ratio (OPR) is a measure of the total pressure rise in a gas turbine engine (i.e., a pressure ratio equal to the air pressure discharged from the last compressor stage and the ambient air pressure entering the engine). Generally speaking, as OPR increases, the thermodynamic efficiency of the gas turbine engine increases, enabling the engine to consume less fuel per unit of thrust (i.e., thrust specific fuel consumption or TSFC) than a corresponding engine with lower OPR. However, air temperatures within the gas turbine engine increase with increasing OPR and can produce temperatures within the compressor section and/or turbine section that exceed permissible material and structural limits. Furthermore, the maximum temperature within the compressor and the turbine increase as the ambient temperature increases, adding to the temperature increase associated with the OPR of the engine.

Conventionally, turbine temperatures are maintained within acceptable limits by limiting OPR to a ratio that produces acceptable turbine temperatures for worst case ambient conditions, typically, design conditions corresponding to hot day take-off. While this technique produces a gas turbine engine design that provides an acceptable compromise for a variety of operating conditions, limiting OPR for hot day take-off conditions produces a gas turbine engine that operates at less OPR than otherwise possible at cruise power, reducing engine efficiency when high efficiency, low fuel consumption operation is most advantageous to extend aircraft range or payload capacity.

SUMMARY

A gas turbine engine in accordance with an exemplary embodiment of this disclosure includes a first spool, a second spool, a third spool, a diffuser, a primary combustor, a secondary combustor, and an outlet duct assembly. The first spool includes a first compressor and a first turbine mounted to a first shaft. The second spool includes a second compressor and a second turbine mounted to a second shaft. The third spool includes a third compressor and a third turbine mounted to a third shaft. The primary combustor is disposed between and fluidly communicates with the first compressor and the first turbine. The secondary combustor is disposed between and fluidly communicates with the second compressor and the second turbine. The diffuser is disposed between and fluidly communicates with the first compressor and the primary combustor. The outlet duct assembly fluidly connects the second turbine to the diffuser and the primary combustor.

In a further exemplary embodiment of the foregoing gas turbine engine, the outlet duct assembly includes a main duct, a plurality of first branch ducts, and a second branch duct. The main duct extends from and communicates with the second turbine. The plurality of first branch ducts extends from and communicate with the main duct and the diffuser. The second branch duct extends from and communicates with the main duct and the primary combustor.

DETAILED DESCRIPTION

As described herein, a gas turbine engine has a boost spool that can be selectively engaged to increase overall pressure ratio (OPR) during certain engine power levels (e.g., cruise power) while operating the gas turbine engine without the boost spool during other power levels (e.g., takeoff power). A transmission rotationally couples boost spool to a low pressure spool of the engine and/or to the accessory gearbox facilitating improved speed profiles for the accessory gearbox. With this arrangement, the gas turbine engine can operate within thermal limits when ambient conditions limit the OPR and can operate with greater engine efficiency when ambient temperatures are lower and permit higher OPR operation.

Figure 1:
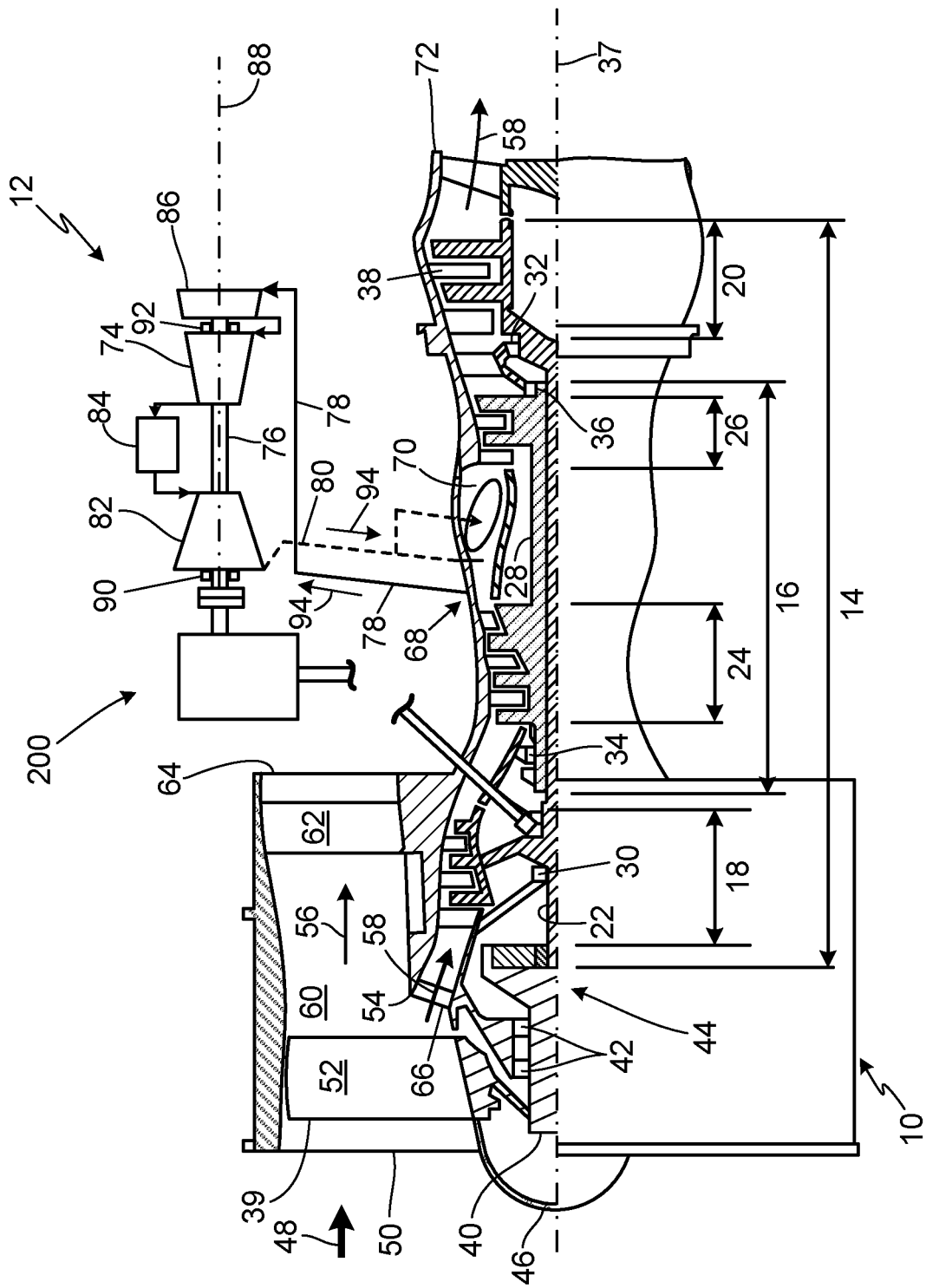
FIG. 1 is a schematic representation of a gas turbine engine that includes a boost spool.

FIG. 1 is a schematic representation of gas turbine engine 10 that includes boost spool 12 in accordance with an exemplary embodiment of this disclosure. Gas turbine engine 10 is a dual spool engine that includes low pressure spool 14 and high pressure spool 16. Low pressure spool 14 includes low pressure compressor 18 mechanically and rotationally connected to low pressure turbine 20 by shaft 22, and high pressure spool 16 includes high pressure compressor 24 mechanically and rotationally connected to high pressure turbine 26 by shaft 28. Bearings 30 and 32 support shaft 22 of low pressure spool 14, and bearings 34 and 36 support shaft 28 of high pressure spool 16, each at forward and aft shaft ends, respectively. Low pressure spool 14 and high pressure spool 16 are coaxial, each extending along and rotating about centerline 37 independently of one another.

Compressors and turbines 18, 20, 24, and 26 include at least one compressor stage or turbine stage, each stage formed by a row of stationary vanes and a row of rotating blades. In the exemplary embodiment depicted by FIG. 1, each of low pressure compressor 18 and high pressure compressor 24 has three stages, and each of low pressure turbine 20 and high pressure turbine 26 has two stages, although the number of stages in each compressor or turbine can be selected based on the desired pressure ratios as is known in the art.

At times, boost spool 12, low pressure spool 14, and high pressure spool 16 may be referred to as a first spool, a second spool, and/or a third spool in which "first", "second", and "third" correspond to one of boost spool 12, low pressure spool 14, and high pressure spool 16. Similarly, "first", "second", and/or "third" labels may be used in conjunction with corresponding components of the first spool, the second spool, and/or the third spool in order to distinguish components of each spool from components of the other spools.

As shown in FIG. 1, at least one vane stage of low pressure turbine 20 includes variable area turbine (VAT) 38. Variable area turbine 38 includes a row of vanes, each vane rotatable about a vane axis extending in a spanwise direction of the vane. The open area through variable area turbine (VAT) 38 changes depending on the stagger angle of vanes with respect to centerline 37. The closed position occurs when vanes form a maximum stagger angle with respect to centerline 37 while the open position occurs when vanes form a minimum, and sometimes negative, stagger angle with respect to centerline 37. The minimum open area typically coincides with the closed position since vanes tend to rotate toward each other, and in some instances vanes overlap when viewed along centerline 37. As vanes move from the closed position towards the open position, the open area through the vane stage increases until a maximum open area is reached, typically near a minimum turning angle, or zero stagger angle position. In some embodiments, the open position coincides with the vane position associated with a maximum open area through the vane row. In other embodiments, vanes can continue to rotate towards the open position in which the vane stagger angle is negative, tending to decrease the open area as the stagger angle becomes more negative. A neutral position or nominal position of vanes can be associated with an angular vane position between the open position and the closed position that achieve a desired incident angle with a rotor of low pressure turbine 20.

Gas turbine engine 10 also includes fan 39 mounted to fan shaft 40. One or more bearings 42 support fan shaft 40, which is mechanically and rotationally coupled to low pressure spool 14. Fan shaft 40 may be directly connected to shaft 22 of low pressure spool 14. With this arrangement, fan 39 and fan shaft 40 rotate at the same speed and in the same direction as low pressure spool 14. In other embodiments, such as the exemplary embodiment depicted in FIG. 1, fan shaft 40 may be rotationally coupled to shaft 22 via gearing 44. For instance, gearing 44 can be an epicyclic gear train that includes a central sun gear mounted to shaft 22, a ring gear mounted to fan shaft 40, and a plurality of plant gears circumferentially spaced about the sun gear and mechanically engaging the ring gear and the sun gear, the planet gears being supported by a planet carrier (not shown). Generally, gas turbine engines utilizing epicyclic gearing to drive fan 39 and fan shaft 40 restrain the planet carrier to cause fan shaft 40 to rotate slower (and in the opposite direction) than low pressure spool 14. Accordingly, fan 39 and low pressure spool 14 can rotate at speeds that are more efficient for respective blade geometries.

In operation, nose cone 46 guides ambient air flow 48 into inlet 50. Rotation of fan 39, which includes circumferentially spaced fan blades 52, compresses ambient air flow 48 before splitter 54 divides flow 48 into bypass flow 56 and core flow 58. Bypass flow 56 passes through bypass duct 60 to structural guide vanes 62 and discharges from engine 10 through a bypass flow exhaust nozzle (not shown), which is downstream from structural guide vane outlet 64. Inlet guide vanes 66 guide core flow 58 into low pressure compressor 18 that subsequently flows into high pressure compressor 24, each compressor stage further compressing core flow 58. Compressed core flow 58 discharges from high pressure compressor 24 into diffuser 68. Diffuser 68 fluidly connects high pressure compressor 24 to combustor 70 and includes divergent walls that reduce core flow 58 velocity and thereby increase static pressure of flow 58 before entering combustor 70. Combustor 70 can be an annular combustor (or another suitable design). Fuel injected into combustor 70 mixes with compressed core flow 58, and one or more ignitors combust the fuel-to-air mixture to produce a compressed and heated core flow 58 that is discharged into high pressure turbine 26. Core flow 58 interacts with vanes and blades of high pressure turbine 26 causing rotation of shaft 28 about centerline 37 and driving rotation of high pressure compressor 24. Similarly, core flow 58 interacting with vanes and blades of low pressure turbine 20 cause rotation of shaft 22 about centerline 37 to drive rotation of low pressure compressor 18 as well as fan shaft 40 directly or via gearing 44. Downstream of low pressure turbine 20, core flow 58 discharges from engine 10 through a core exhaust nozzle (not shown) which is downstream from structural guide vane outlet 72.

Boost spool 12 includes at least boost compressor 74 and shaft 76 fluidly connected to gas turbine engine 10 by inlet duct assembly 78 and outlet duct assembly 80. In some embodiments, boost spool 12 also includes one or more of boost turbine 82, combustor 84, and variable inlet guide vanes 86. Boost compressor 74 and boost turbine 82 include at least one compressor stage or turbine stage, each stage formed by a row of stationary vanes and a row of rotating blades. Variable inlet vanes 86 form an array of circumferentially spaced vanes at an inlet to boost spool 12 and upstream of boost compressor 74. Each vane of variable inlet guide vanes 86 is rotatable about a vane axis that extends in a spanwise direction of the vane. An angular position of variable inlet guide vanes 86 ranges between a closed position, a neutral or nominal position, and an open position in the same manner as vanes of variable area turbine 38. During operation of boost spool 12, variable inlet vanes 86 can pivot to decrease or increase the open inlet area in order to vary the amount of core flow 58 diverted into boost compressor 74 through inlet duct assembly 78. Shaft 76 mechanically and rotationally connects boost compressor 74 to boost turbine 82, each component arranged coaxially with boost axis 88. Bearings 90 and 92 support boost spool 12 with respect to a stationary casing, which may be affixed or incorporated to a casing of gas turbine engine 10. Transmission 200 mechanically and rotationally couples boost spool 12 to one or more spools of gas turbine engine 10 (e.g., low pressure spool 14 and/or high pressure spool 16). For instance, transmission 200 includes gear 202 mounted to shaft 22. Tower shaft 204 includes gear 206 mounted to or integrally formed at a radially inner end of tower shaft 204. Gear 206 enmeshes with shaft-mounted gear 202 to rotationally couple shaft 76 (i.e., boost spool 12) to shaft 22 (i.e., low pressure spool 14). At radially outer end of tower shaft 204, transmission 200 can include one or more gears, an epicyclic gear train, or other mechanical arrangement that rotationally couples boost spool 12 to low pressure spool 14.

The position and orientation of boost spool 12 relative to gas turbine 10 is selected base on the particular details of the mechanical coupling to gas turbine engine 10. Boost axis 88 can be parallel and offset from centerline 37 of gas turbine engine 10 as schematically shown by FIG. 1. Furthermore, FIG. 1 shows boost spool 12 with a reverse flow orientation (i.e., aft-to-forward flow) such that a flow direction through boost spool 12 from compressor 74 to turbine 82 is opposite a flow direction (i.e., forward-to-aft flow) through gas turbine engine 10 from inlet 50 to bypass outlet 64 and from inlet 50 to a core exhaust nozzle (not shown) which is downstream from structural guide vane outlet 72. Alternatively, boost axis 88 can be oblique or perpendicular to centerline 37.

For all mounting positions of boost spool 12, the location and orientation of boost spool 12 permits boost spool 12 to receive a compressed air flow from gas turbine engine 10 and to discharge an expanded air flow to gas turbine engine 10. Boost spool 12 can receive a compressed airflow from any compressor stage of gas turbine engine 10 to achieve varying degrees of boost compression. In one exemplary embodiment, boost spool 12 receives a compressed air flow from a location that is downstream from the last compressor stage of the gas turbine engine. In the case of gas turbine engine 10, boost spool 12 receives airflow from diffuser 68 and discharges an expanded airflow to diffuser 68. In other instance, boost spool receives airflow from diffuser 68 and discharges an expanded airfoil to both diffuser 68 and combustor 70, which is downstream of high pressure compressor 24 and upstream from high pressure turbine 26.

In operation, boost spool 12 receives a portion of core flow 58 extracted from diffuser 68 (i.e., boost flow 94) and routed to an inlet of boost compressor 74 through inlet duct assembly 78. Within boost compressor 74, the pressure and temperature of boost flow increases with each compressor stage. Compressed boost flow 94 enters combustor 84 where injected fuel mixes with compressed boost flow 94. Once the fuel-air mixture is ignited, boost flow 94 discharges into boost turbine 82. Turbine 82 expands boost flow 94 across each turbine stage, driving turbine 82, shaft 76, and compressor 74. Expanded boost flow 94 discharges from boost spool 12 through outlet duct assembly 80, which may route discharged air to diffuser 68, combustor 70, or both diffuser 68 and combustor 70.

A pressure ratio of boost spool 12 (i.e., a boost pressure ratio) can be expressed as a ratio of air pressure at an inlet of turbine 74 divided by air pressure at an outlet of turbine 82. For instance, boost pressure ratio of boost spool 12 can be between 0.9 and 1.1 in some embodiments.

Figure 2:
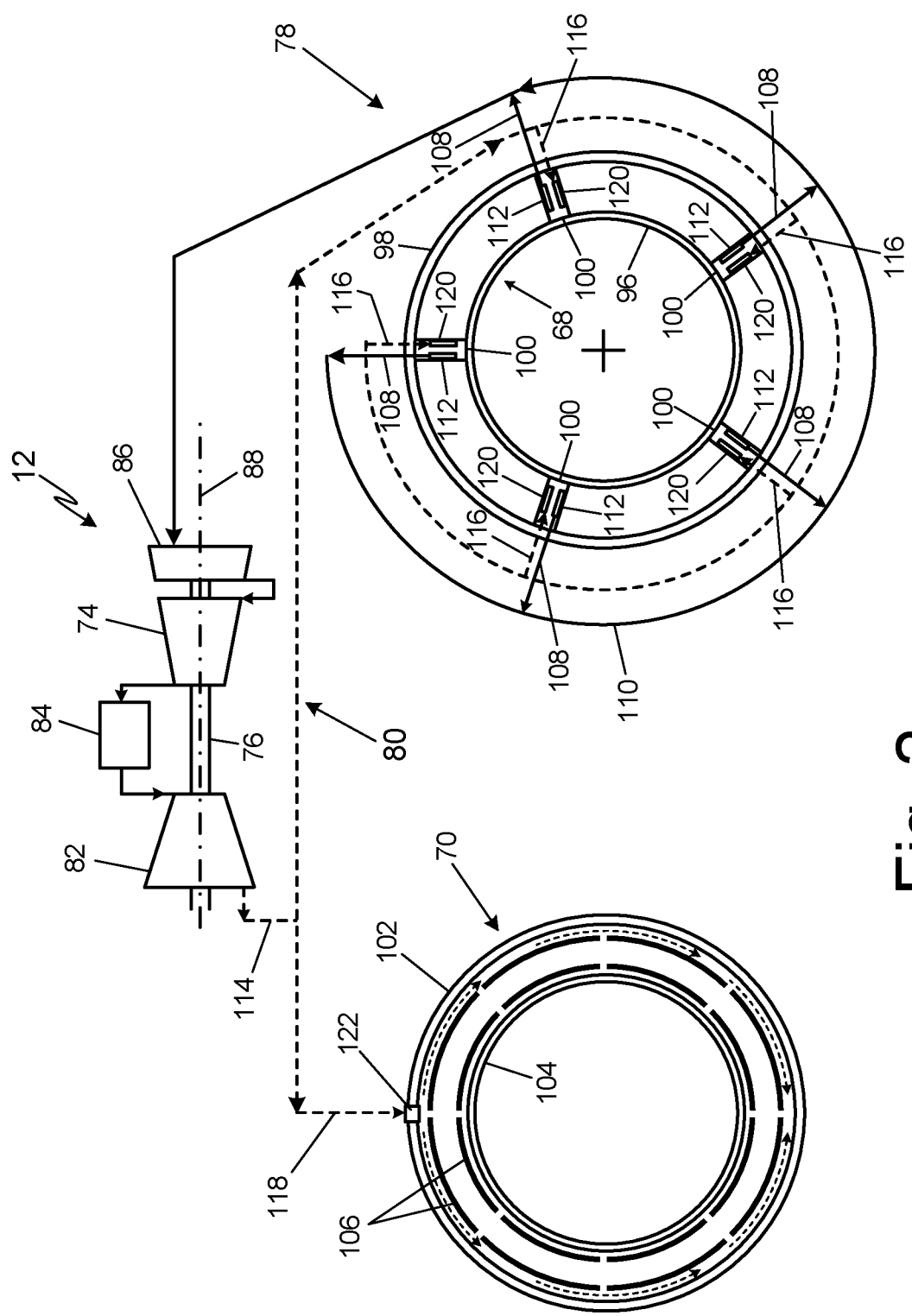
FIG. 2 is a schematic depicting inlet and outlet duct assemblies for the boost spool

FIG. 2 schematically depicts inlet duct assembly 78 that extracts a portion of core flow 58 from diffuser 68 and outlet duct assembly 80 that discharges the boost flow to diffuser 68 and combustor 70. As shown, diffuser 68 includes inner peripheral wall 96 and outer peripheral wall 98 spaced radially outward from wall 96. Multiple struts 100 extend from inner peripheral wall 96 to outer peripheral wall 98 of diffuser 68. FIG. 2 depicts five struts 100. However more or less struts 100 can be used in other examples, each incorporating features of inlet duct assembly 78 and outlet duct assembly 80 discussed below. Combustor 70 includes outer casing 102 and spaced radially from inner casing 104 to define an annular combustion chamber. Inner casing 104 and outer casing 102 are thermally protected by segmented liners 106.

Depicted using solid lines, inlet duct assembly 78 includes multiple branch ducts 108 collected into inlet manifold 110. Each branch duct 108 communicates with diffuser 68 via respective branch inlets 112. In some embodiments, branch inlets 112 can be formed by inner and/or outer peripheral walls of diffuser 68 such that branch ducts 108 extract core flow 58 through inner and outer walls of diffuser 68. In other embodiments, branch inlets 112 are formed by respective struts 100. Branch inlet ducts 108 extend from branch inlets 112 to inlet manifold 110. Inlet manifold 110 can be a pipe, duct, or plenum accommodating the collected flow through each branch inlet duct 108 and routing the accumulated inlet flow to inlet of boost spool 12.

Depicted using dashed lines, outlet duct assembly 80 can include one or more ducts extending from an outlet of boost turbine 82 to diffuser 68, combustor 70, or both diffuser 68 and combustor 70. In one exemplary embodiment, outlet duct assembly 80 can include main duct 114 extending from an outlet of boost turbine 82 to one or more branch outlet ducts 116, one or more branch outlet ducts 118, or one or more branch outlet ducts 116 and one or more branch outlet ducts 118. Each branch outlet duct 116 extends from main duct 114 to one of boost outlets 120 formed in an inner peripheral wall or an outer peripheral wall of diffuser 68, or a wall of strut 100, placing main duct 114 and boost turbine 82 in communication with diffuser 68. Each branch outlet duct 118 extends from main duct 114 to one of boost outlets 122 formed in a peripheral wall of combustor 70, placing main duct 114 and boost turbine 82 in communication with combustor 70.

As shown in FIG. 2, outlet duct assembly 80 includes main duct 114, multiple branch ducts 116, and branch duct 118. Main duct 114 extends from boost turbine 82 to each branch outlet duct 116 and branch duct 118. Branch outlet ducts 116 extend from main duct 114 to boost outlets 120 formed in walls of respective struts 100. Branch outlet duct 118 extends from main duct 114 to boost outlet 122 formed in a peripheral wall bounding a combustion zone of combustor 70.

Figure 3:
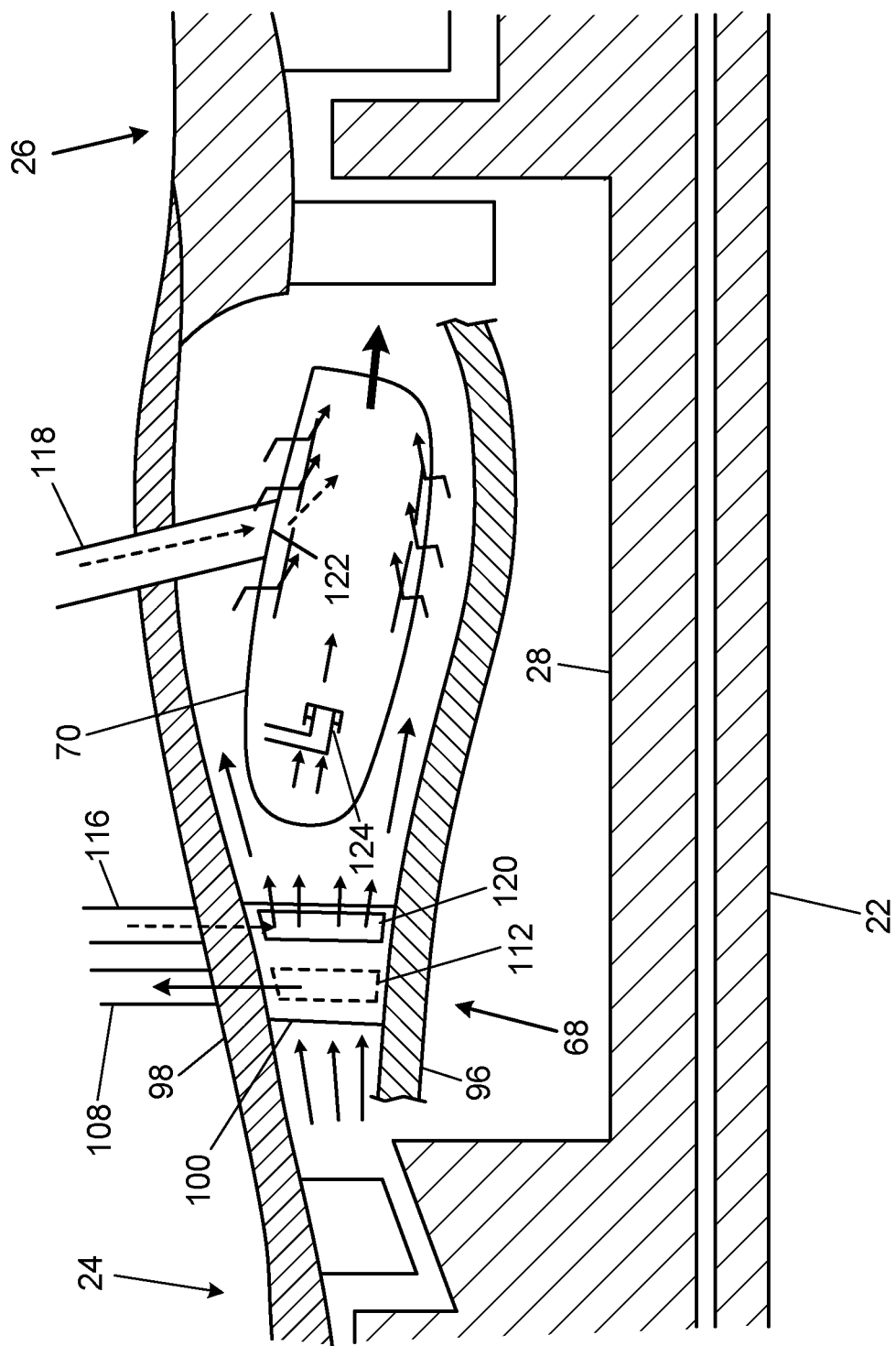
FIG. 3 is a schematic depicting diffuser and primary combustor of the gas turbine engine.

FIG. 3 is a schematic of diffuser 68 and combustor 70 of gas turbine engine 10. As shown, branch inlet duct 108 extracts air from core flow 58 through inlet 112, and branch duct 116 discharges boost exhaust flow through outlet 120. Branch inlets 112 and branch outlets 120 are formed by strut 100. One or both of branch inlet 112 and branch outlet 120 can extend from inner peripheral wall 96 to outer peripheral wall 98. Outlet 122 of branch outlet duct 118 discharges through outer casing of combustor 70. The location of outlet 122 is spaced axially downstream from injectors 124, or between injectors 124 and high pressure turbine 26.

Figure 4:
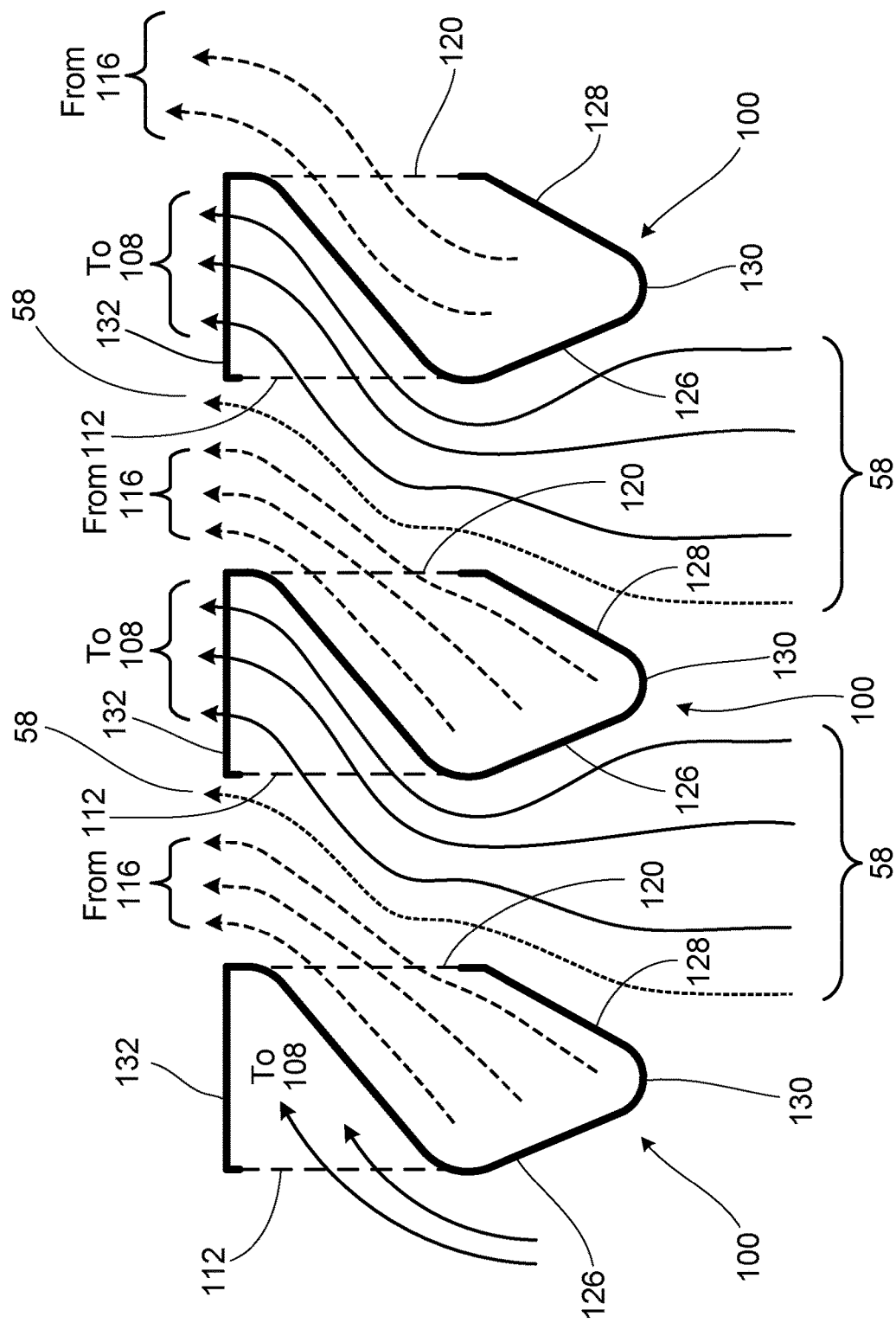
FIG. 4 is schematic of diffuser inlet and outlet areas of the inlet and outlet duct assemblies.

FIG. 4 depicts another schematic view of struts 100 and the flow distribution within diffuser 68. Each strut 100 includes first side wall 126 and second side wall 128 extending from leading edge 130 of strut 100 to rear wall 132. Inlets 112 are disposed in one of sidewalls 126 and 128 while outlets 120 are disposed in the other sidewall opposite the inlet sidewall. During operation of boost spool 12, a portion of compressed core flow 58 enters each inlet 112 and flows through branch inlet ducts 108 and manifold 110 to the inlet of boost spool 12 and boost compressor 74. A portion of boost spool flow exiting boost turbine 82 flows through each branch outlet duct 116 before discharging through each outlet 120 into diffuser 68.

An outlet flow division can be achieved with appropriate selection of length, cross-sectional area, and routing of main duct 114, diffuser branch ducts 116, combustor branch duct 118 and associated outlets 120 and 122 of outlet duct assembly 80. A minimum mass flow rate of boost exhaust discharged to diffuser 68 through outlets 120 relates to an amount of flow required to maintain flow into boost spool 12 through inlet duct assembly 78. Adequate flow through inlet duct assembly 78 can be achieved by maintaining at least a minimum static pressure at branch inlets 112 throughout all operating conditions during which boost spool 12 can be operated, including transient periods associated with starting or stopping boost spool 12. The maximum mass flow rate of boost exhaust discharged to diffuser 68 through outlets 120 relates to a maximum temperature of fuel injectors within combustor 70. As boost exhaust mass flow rate increases, a temperature of compressed air entering combustor 70 increases. Accordingly, the maximum permitted temperatures of components of combustor 70 during continuous operation limits the maximum mas flow rate of boost exhaust returned to diffuser 68 through outlets 120.

Expressed as a percentage of total flow through boost spool 12, five percent to forty percent of boost exhaust flow can be discharged into diffuser 68 while the remainder ninety-five percent to sixty percent of boost exhaust flow can be discharged to combustor 70.

The flow division of boost exhaust between diffuser 68 and combustor 70 allows boost outlets 120 to extend from the inner peripheral wall to the outer peripheral wall of diffuser 68 as shown in FIG. 3. As the radial extent of boost outlets 120 approaches the full radial extent of diffuser 68 at struts 100, flow uniformity and flow stability increase within diffuser 68 while component temperatures within combustor 70 remain acceptable for continuous operation.

Figure 5:
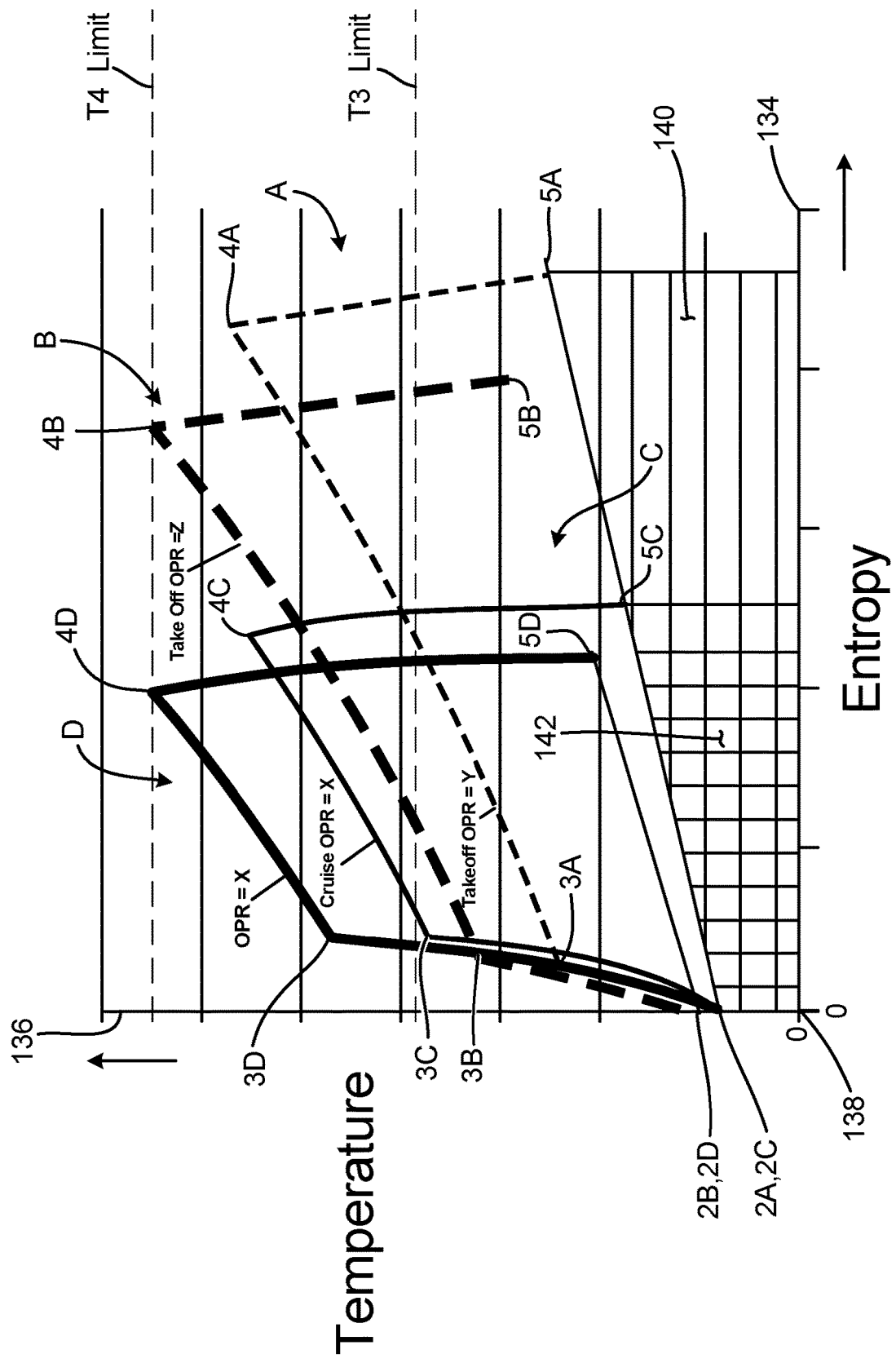
FIG. 5 is a T-s diagram illustrating the thermodynamic performance of a gas turbine engine operating with a boost spool relative to a gas turbine engine operating without a boost spool.

FIG. 5 is a T-s diagram illustrating the thermodynamic performance of gas turbine engine 10 boosted by spool 12 relative to gas turbine engine 10 operating without boost spool 12. Entropy is displayed along abscissa axis 134, and temperature is displayed along ordinate axis 136, each increasing from origin 138. Dashed curve A depicts the preferred thermodynamic cycle of gas turbine engine 10 operating without boost engaged at takeoff power on a hot day. Dashed curve B depicts the thermodynamic cycle of gas turbine engine 10 were boost to be engaged while operating at takeoff power on a hot day. Solid curve C depicts gas turbine engine 10 operating without boost spool 12 engaged while operating at cruise power. Solid curve D depicts the preferred thermodynamic cycle of gas turbine engine 10 operating with boost engaged while operating at cruise power having an OPR (value=X) that is greater than the OPR of boosted gas turbine engine 10 were boost to be engaged while operating at takeoff power on a hot day.

Each of curves A, B, C, and D are defined by points 2, 3, 4, and 5, respectively. Accordingly, dashed curve A extends from point 2A to point 3A, representing the compression work completed by engine 10 between engine inlet 50 and the exit of high pressure compressor 24 (see FIG. 1). From point 3A, dashed curve A extends along a line of constant pressure ratio (value=Y) to point 4A that represents the heat added to core flow 58 through combustion. After combustion, high pressure turbine 26 and low pressure turbine 20 extract work from the heated and compressed core flow 58, a process represented by dashed line A between points 4A and 5A. Dashed curve B extends between point 2B to point 3B during the compression phase, between point 3B and 4B along a line of constant pressure ratio (value=Z) during combustion, and between point 4B and 5B during turbine expansion. Solid curves C and D are defined by points 2C, 3C, 4C, and 5C and points 2D, 3D, 4D, and 5D in a similar manner to curves A and B. An engine operating along curve A has less OPR (value Y) than an engine operating on any of the other curves (i.e., curves C and D having an OPR equal to value X and curve B having an OPR value equal to Z). Moreover, an engine operating on curves C and D have an OPR value X that is greater than an engine operating on curve B with an OPR value Z.

The temperature entering the compressor section of gas turbine engine 10 at cruise power is lower than the temperature entering the compressor section of gas turbine engine 10 at takeoff power because the ambient temperature at cruising altitude is lower than the ambient temperature during a hot day takeoff. For example, at cruising altitude, the ambient temperature can be approximately −26.1 degrees Celsius (or about −15 degrees Fahrenheit) while on a hot day takeoff, the ambient temperature can be approximately 46.1 degrees Celsius (or about 115 degrees Fahrenheit). For each curve, the temperature within the engine at points 3A, 3B, 3C, and 3D are limited to a line of constant temperature labeled "T3 Limit" while the temperature at points 4A, 4B, 4C, and 4D are limited to a line of constant temperature labeled "T4 Limit".

Unboosted operation of gas turbine engine 10 represented by dashed curve A trades engine fuel efficiency and engine materials life between temperature limits during a hot day takeoff and cruising. As a result, the OPR of unboosted operation of engine 10 is reduced for hot day takeoff conditions (i.e., the temperature at point 4A is lower than the temperature at 4B). The area bounded by dashed curve A and a line connecting points 5A and 2A represent the amount of work completed by engine 10 while operating at takeoff power and without boost spool 12 operation. The area bounded by dashed curve B and a line connecting points 5B and 2B represent the amount of work completed by engine 10 while operating at takeoff power and with boost spool 12 operation. The two areas are the same and the amounts of work completed by the engine at takeoff are the same. The amount of heat energy rejected by gas turbine engine 10 while operating in accordance with dashed curve A is shown by horizontally-hatched area 140. The thermodynamic efficiency of gas turbine engine 10 operating in accordance with dashed curve A is the work energy divided by the summation of work and rejected heat energy defined by curve A.

Contrastingly, the work performed by gas turbine engine 10 with the aid of boost spool 12 is bounded by curve D and a line extending between points 5D and 2D while the heat energy rejected by boosted gas turbine engine 10 operating at cruise power is shown by vertically-hatched area 142. Regions where areas 140 and 142 overlap appear as a square-hatched area. By comparing the sizes of work areas bounded by curves D and C relative to heat rejection areas 140 and 142, respectively, it is evident that work area D represents a larger percentage of the total area under curve D than corresponding areas under curve C. Accordingly, operating gas turbine engine 10 with boost spool 12 at cruise power results in more efficient thermodynamic operation and, thus, improved thrust specific fuel consumption (TSFC) than operating engine 10 without boost spool 12. Furthermore, a gas turbine engine with the same OPR as boost engine operation depicted by curve D does not have the improved engine fuel efficiency and same life of operation. As shown in FIG. 5 (i.e., the temperature at 4B is higher than the temperature at 4A). As such, gas turbine engine 10 can be operated without boost spool 12 during hot day takeoff conditions (i.e., dashed curve A) and can be operated with boost spool 12 at cruise power (i.e., solid curve D) to achieve greater thermal efficiency at cruise power while satisfying thermal limits for hot day takeoff conditions.

Discussion of Possible Embodiments

The following are non-exclusive descriptions of possible embodiments of the present invention.

A gas turbine engine according to an exemplary embodiment of this disclosure includes, among other possible things, a first spool, a second spool, a third spool, a primary combustor, a diffuser, a secondary combustor, and an outlet duct assembly. The first spool includes a first compressor and a first turbine mounted to a first shaft. The second spool includes a second compressor and a second turbine to a second shaft. The third spool includes a third compressor and a third turbine mounted to a third shaft. The primary combustor is disposed between and fluidly communicating with the first compressor and the first turbine. The diffuser is disposed between and fluidly communicating with the first compressor and the primary combustor. A secondary combustor is disposed between and fluidly communicating with the second compressor and the second turbine. The outlet duct assembly fluidly connects the second turbine to the diffuser and the primary combustor. The outlet duct assembly includes a main duct, a plurality of first branch ducts, and a second branch duct. The main duct extends from and communicates with the second turbine. The plurality of branch ducts extends from and communicate with the main duct and the diffuser. The second branch duct extends from an communicates with the main duct to the primary combustor.

The gas turbine engine of the preceding paragraph can optionally include, additionally and/or alternatively, any one or more of the following features, configurations, and/or additional components.

A further embodiment of the foregoing gas turbine engine, wherein the diffuser includes an inner wall, an outer wall, and a plurality of struts. The outer wall is radially spaced from the inner wall to define an annular section that diverges towards the primary combustor. The plurality of struts extend radially from the inner wall to the outer wall and circumferentially distributed within the annular section. Each strut of the plurality of struts defines a discharge area of one of the first branch ducts.

A further embodiment of any of the foregoing gas turbine engines wherein the discharge area of each first branch duct can extend from the inner wall to the outer wall.

A further embodiment of any of the foregoing gas turbine engines, wherein the second branch duct can communicate with a combustion zone of the primary combustor downstream from a plurality of fuel injectors.

A further embodiment of any of the foregoing gas turbine engines can include an inlet duct assembly.

A further embodiment of any of the foregoing gas turbine engines, wherein the inlet duct assembly can include a plurality of inlet branch ducts, each inlet branch duct extends from an inlet defined by one of the plurality of struts. A further embodiment of any of the foregoing gas turbine engines, wherein the inlet duct assembly can include a main inlet duct communicating with the plurality of inlet branch ducts and the second compressor.

A further embodiment of any of the foregoing gas turbine engines, wherein a boost pressure ratio can be equal to a first air pressure at an inlet of the second compressor divided by a second air pressure at an outlet of the second turbine.

A further embodiment of any of the foregoing gas turbine engines, wherein the boost pressure ratio can between 0.9 and 1.1.

A gas turbine engine according to another exemplary embodiment of this disclosure includes, among other possible things, a first spool, a second spool, a third spool, a primary combustor, diffuser, secondary combustor, and an outlet duct assembly. The first spool includes a first compressor and a first turbine mounted to a first shaft. The second spool includes a second compressor and a second turbine mounted to a second shaft. The third spool includes a third compressor and a third turbine mounted to a third shaft. The primary combustor is disposed between and fluidly communicates with the first compressor and the first turbine The primary combustor includes a combustion plenum and a plurality of injectors. The combustion plenum is bound by a casing. The casing defines an annular cross-section normal to a centerline of the gas turbine engine. The diffuser is deposed between and fluidly communicates with the first compressor and the primary combustor. The diffuser includes an inner wall, an outer wall, and a plurality of struts. The outer wall is radially spaced from the inner wall to define an annular section that diverges towards the primary combustor. The plurality of struts extends radially from the inner wall to the outer wall. The struts are circumferentially distributed within the annular section. The secondary combustor is disposed between and fluidly communicating with the second compressor and the second turbine. The outlet duct assembly fluidly connects the second turbine to the diffuser and the primary combustor. The outlet duct assembly includes a main duct, a plurality of first branch ducts, and a second branch duct. The main duct extends from and communicates with the second turbine. The plurality of branch ducts extends from and communicates between the main duct to the diffuser. Each strut of the plurality of struts defines a discharge area of one of the first branch ducts. The second branch duct extends from and communicates between the main duct to the primary combustor. The second branch duct communicates with the combustion plenum through a discharge outlet. The discharge outlet is axially spaced along the centerline from the plurality of injectors.

The gas turbine engine of the preceding paragraph can optionally include, additionally and/or alternatively, any one or more of the following features, configurations, and/or additional components.

A further embodiment of the foregoing gas turbine engine, wherein the discharge area of each first branch duct can extend from the inner wall to the outer wall.

A further embodiment of any of the foregoing gas turbine engines can include an inlet duct assembly.

A further embodiment of any of the foregoing gas turbine engines, wherein the inlet duct assembly includes a plurality of inlet branch ducts and a main inlet duct.

A further embodiment of any of the foregoing gas turbine engines, wherein each inlet branch duct extends from an inlet defined by one of the plurality of struts.

A further embodiment of any of the foregoing gas turbine engines, wherein the main inlet duct communicates with the plurality of inlet branch ducts and the second compressor.

A further embodiment of any of the foregoing gas turbine engines can include a gear mounted to the third shaft.

A further embodiment of any of the foregoing gas turbine engines can include a tower shaft enmeshes with the gear and extends radially outward from the third shaft.

A further embodiment of any of the foregoing gas turbine engines can include a transmission rotationally coupling the tower shaft to the second shaft.

A further embodiment of any of the foregoing gas turbine engines, wherein the first compressor can be a high pressure compressor and the third compressor can be a low pressure compressor.

A further embodiment of any of the foregoing gas turbine engines, wherein the first turbine can be a high pressure turbine and the third turbine can be a low pressure turbine.

A further embodiment of any of the foregoing gas turbine engines, wherein the third shaft can be concentric with the first shaft.

A further embodiment of any of the foregoing gas turbine engines, wherein the third shaft can extend through the first shaft such that the first compressor, the primary combustor, and the first turbine are disposed between the third compressor and the third turbine.

A further embodiment of any of the foregoing gas turbine engines, wherein the first shaft can be concentric with the third shaft.

A further embodiment of any of the foregoing gas turbine engines, wherein the second shaft can be parallel and offset to the first shaft and the third shaft.

A further embodiment of any of the foregoing gas turbine engines, wherein the discharge areas of the first branch ducts can collectively define a net discharge area of the plurality of first branch ducts.

A further embodiment of any of the foregoing gas turbine engines, wherein a ratio of the net discharge area of the plurality of first branch ducts to an area of the discharge outlet of the second branch duct can be between 0.25 to 0.75.

A further embodiment of any of the foregoing gas turbine engines, wherein a boost pressure ratio can be equal to a first air pressure at an inlet of the second compressor divided by a second air pressure at an outlet of the second turbine.

A further embodiment of any of the foregoing gas turbine engines, wherein the boost pressure ratio can be between 0.9 and 1.1.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A gas turbine engine comprising:
   a first spool comprising a first compressor and a first turbine mounted to a first shaft;
   a second spool comprising a second compressor and a second turbine mounted to a second shaft;
   a third spool comprising a third compressor and a third turbine mounted to a third shaft;
   a primary combustor disposed between and fluidly communicating with the first compressor and the first turbine;
   a diffuser disposed between and fluidly communicating with the first compressor and the primary combustor;
   a secondary combustor disposed between and fluidly communicating with the second compressor and the second turbine; and
   an outlet duct assembly fluidly connecting the second turbine to the diffuser and the primary combustor, the outlet duct assembly comprising:
      a main duct extending from and fluidly communicating with the second turbine;
      a plurality of first branch ducts extending from the main duct to one or more boost outlets in the diffuser and fluidly communicating between the main duct and the one or more boost outlets in the diffuser; and
      a second branch duct extending from the main duct to a discharge outlet on a peripheral wall of the primary combustor and fluidly communicating between the main duct and the primary combustor.

2. The gas turbine engine of claim 1, wherein the diffuser comprises:
   an inner wall;
   an outer wall radially spaced from the inner wall to define an annular section that diverges towards the primary combustor; and
   a plurality of struts extending radially from the inner wall to the outer wall and circumferentially distributed within the annular section, each strut of the plurality of struts defines a discharge area of one of the first branch ducts.

3. The gas turbine engine of claim 2, wherein the discharge area of each first branch duct extends from the inner wall to the outer wall.

4. The gas turbine engine of claim 1, wherein the second branch duct communicates with a combustion zone of the primary combustor downstream from a plurality of fuel injectors.

5. The gas turbine engine of claim 2, further comprising:
   an inlet duct assembly comprising:
      a plurality of inlet branch ducts, each inlet branch duct extending from an inlet defined by one of the plurality of struts; and
      a main inlet duct communicating with the plurality of inlet branch ducts and the second compressor.

6. The gas turbine engine of claim 1, wherein a boost pressure ratio is equal to a first air pressure at an inlet of the second compressor divided by a second air pressure at an outlet of the second turbine, and wherein the boost pressure ratio is between 0.9 to 1.1.

7. A gas turbine engine comprising:
   a first spool comprising a first compressor and a first turbine mounted to a first shaft;
   a second spool comprising a second compressor and a second turbine mounted to a second shaft;
   a third spool comprising a third compressor and a third turbine mounted to a third shaft;
   a primary combustor disposed between and fluidly communicating with the first compressor and the first turbine, the primary combustor comprising:
      a combustion plenum bound by a casing with an annular cross-section normal to a centerline of the gas turbine engine; and
      a plurality of fuel injectors housed within the combustion plenum;
   a diffuser disposed between and fluidly communicating with the first compressor and the primary combustor; the diffuser comprising:
      an inner wall;
      an outer wall radially spaced from the inner wall to define an annular section that diverges towards the primary combustor; and
      a plurality of struts extending radially from the inner wall to the outer wall and circumferentially distributed within the annular section;
   a secondary combustor disposed between and fluidly communicating with the second compressor and the second turbine; and
   an outlet duct assembly fluidly connecting the second turbine to the diffuser and the primary combustor, the outlet duct assembly comprising:
      a main duct extending and fluidly communicating with the second turbine;
      a plurality of first branch ducts extending from and fluidly communicating between the main duct to the diffuser, wherein each strut of the plurality of struts defines a discharge area of one of the first branch ducts; and
      a second branch duct section extending from and fluidly communicating between the main duct section to a discharge outlet in a peripheral wall of the primary combustor, wherein the second branch duct communicates with a combustion zone in the primary combustor through the discharge outlet, and wherein the discharge outlet is axially spaced along the centerline from the plurality of injectors.

8. The gas turbine engine of claim 7, wherein the discharge area of each first branch duct extends from the inner wall to the outer wall.

9. The gas turbine engine of claim 8, further comprising: an inlet duct assembly comprising: a plurality of inlet branch ducts, each inlet branch duct extending from an inlet defined by one of the plurality of struts; and a main inlet duct communicating with the plurality of inlet branch ducts and the second compressor.

10. The gas turbine engine of claim 9, further comprising:
a gear mounted to the third shaft;
a tower shaft enmeshing with the gear and extending radially outward from the third shaft; and
a transmission rotationally coupling the tower shaft to the second shaft.

11. The gas turbine engine of claim 10, wherein the first compressor is a high pressure compressor and the third compressor is a low pressure compressor, and wherein the first turbine is a high pressure turbine and the third turbine is a low pressure turbine.

12. The gas turbine engine of claim 11, wherein the third shaft is concentric with the first shaft and extends through the first shaft such that the first compressor, the primary combustor, and the first turbine are disposed between the third compressor and the third turbine.

13. The gas turbine engine of claim 7, wherein the first shaft is concentric with the third shaft, and wherein the second shaft is parallel and offset to the first shaft and the third shaft.

14. The gas turbine engine of claim 7, wherein the discharge areas of the first branch ducts collectively define a net discharge area of the plurality of first branch ducts, and wherein a ratio of the net discharge area of the plurality of first branch ducts to an area of the discharge outlet of the second branch duct is between 0.25 to 0.75.

15. The gas turbine engine of claim 8, wherein a boost pressure ratio is equal to a first air pressure at an inlet of the second compressor divided by a second air pressure at an outlet of the second turbine, and wherein the boost pressure ratio is between 0.9 to 1.1.

* * * * *